Sept. 8, 1936.    D. TELSON ET AL    2,053,383
BLOOD PRESSURE TESTING MEANS
Filed Nov. 2, 1932    2 Sheets-Sheet 1

INVENTORS
David Telson and
Ernest D. Resnik
BY
*Frank V. Ordway*
ATTORNEY

Sept. 8, 1936. D. TELSON ET AL 2,053,383
BLOOD PRESSURE TESTING MEANS
Filed Nov. 2, 1932    2 Sheets-Sheet 2
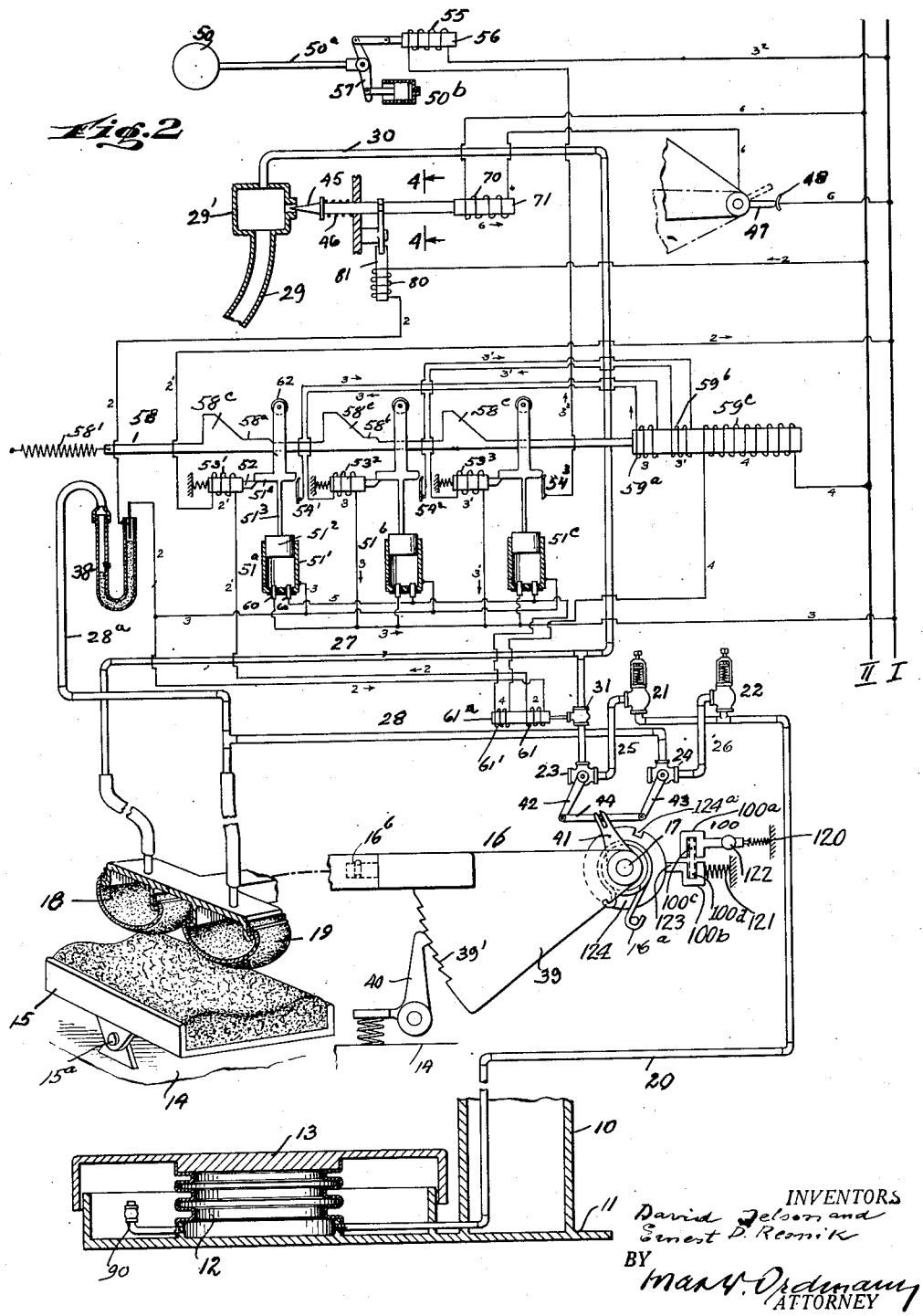
INVENTORS
David Telson and
Ernest D. Remick
BY
Max V. Ordmann
ATTORNEY Patented Sept. 8, 1936

2,053,383

UNITED STATES PATENT OFFICE 2,053,383

BLOOD PRESSURE TESTING MEANS

David Telson and Ernest D. Resnik, Brooklyn, N. Y.

Application November 2, 1932, Serial No. 640,830

15 Claims. (Cl. 73—44)

Modern medicine is much more concerned now than ever before with the prevention of disease and its recognition in its incipiency. Because of the alarming rate with which circulatory diseases are increasing it would be of great advantage to render it possible for great masses of people to readily recognize the first symptoms of an oncoming disease of the circulatory system. Hitherto no means have been provided whereby men and women could themselves ascertain their blood pressures. Usually they consult a physician long after the high blood pressure has been in existence and when prevention of disease is already rendered impossible.

It is, therefore, the main object of our invention to provide means whereby any person may test his or her own blood pressure, just as easily and correctly as ascertaining his or her weight on a weighing scale, so that attention may be immediately called to the urgency of seeking medical advice.

Another object of our invention is to construct said means in the form of a machine that can be easily manipulated by anyone and that will indicate to the user the correct blood pressure.

A still further object is to provide a construction that will be comparatively simple and inexpensive.

And still another object is to construct the machine so that it can be placed in public places, such as drugstores or the like to be, like weighing scales, accessible to the general public.

Another object is to provide means whereby the machine can be operated after the deposit of a coin.

And another object is to provide means enabling the user to hear his or her own true pulse.

With these and other objects in view our invention consists in the novel construction, arrangement and combination of parts as will be hereinafter more fully described and defined in the appended claims.

In the accompanying drawings which form part of this specification and in which the reference characters denote corresponding parts:—

Fig. 2 is a sectional diagrammatic view of some parts of said machine showing also the electrical means for operating the same;

Figure 5:
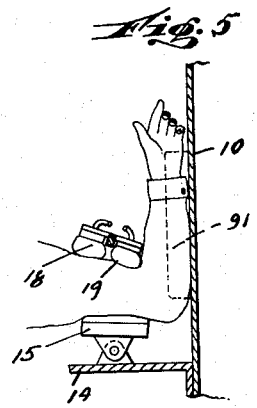
Figure 4:
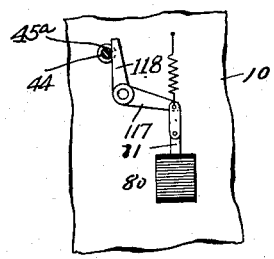
Figure 6:
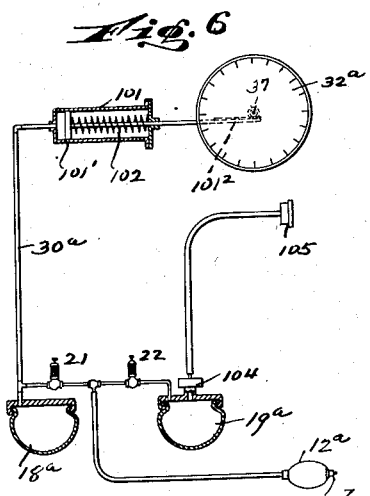

Fig. 4 an elevation of a detail;

Fig. 5 is a sectional side view of a part of the machine showing the position of the user's arm on the rest while the blood pressure is being taken; and Fig. 6 is a diagrammatic view of a modified construction and of means for rendering the pulse audible to the user.

Referring to the drawings more specifically and first to Figs. 1–5, 10 denotes a hollow apertured stand or frame having a base 11 on the front part of which is mounted a suitable air compressor 12 or the like on which bears a platform 13 for the user.

On the front face of the frame is provided at a certain convenient elevation from the platform a shelf or support 14 on which is mounted a cushioned arm rest 15. In range with said arm rest is a rock lever arm 16 which is fulcrumed on the frame as at 17 and which carries at its lower face two compressed air receivers, such as inflatable cuffs or bags 18 and 19.

The operating rock lever 16 has fixed on its pivot 17 (Figs. 1 and 2) a sector 39 formed with ratchet teeth 39' with which cooperates a manually operated spring tensioned pawl 40 mounted on the shelf 14 and which serves to arrest the arm in its operative position at which the cuff 18 compresses the user's arm to stop the circulation of the blood. When in use one of these receivers, 18, is adapted to be filled with compressed air of a predetermined maximum pressure, say 300 mm. mercury column, while the other receiver 19 is adapted to be filled with compressed air of a minimum pressure, say 30 mm. of mercury. The first named receiver is adapted to serve as blood occluding means and the second one as a pulse detector.

A pipe 20 leads from the air compressor 12 to two pressure control valves 21, 22 of any suitable well known construction, through branch pipes 25, 26 and thence to three-way exhaust valves 23, 24 respectively, valve 23 being connected by pipe 27 to the high pressure cuff 18 and valve 24, by pipe 28 to the low pressure cuff 19.

Figure 3:
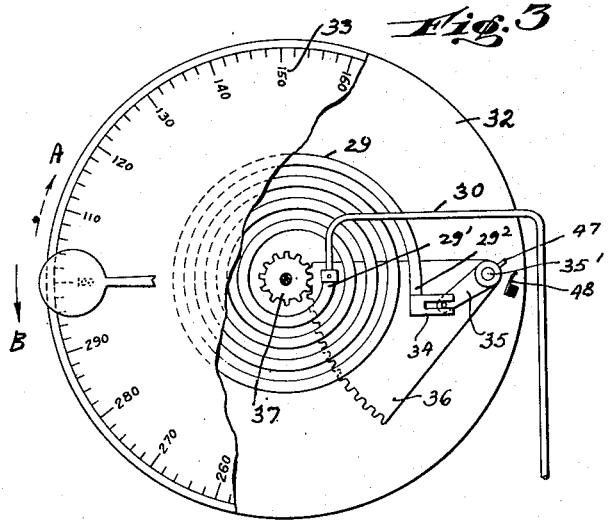
Fig. 3 is an elevation of a part of the pressure recording device.

Inside the frame at a suitable elevation is mounted the blood pressure recording or indicating device. In the present embodiment of our invention this device comprises an expansible helical tube 29 of the Bourdon type (Fig. 3) the inner open end 29' of which is connected to a pipe 30 leading from exhaust valve 23 through a cut off valve 31. The outer end of said tube 29 is closed and is operatively connected to a dial disk 32, the circumference of which is graduated and bears consecutive numbers or characters 33 indicating pressures in millimeters of mercury from a certain maximum to a certain minimum. The closed end 29² of the tube 29 may be formed with a forked member 34 or other suitable means to engage a lever arm 35 fulcrumed at 35' to the frame. Fixed on the axis of said arm 35 is a toothed sector 36 which meshes with a pinion 37 fixed centrally to said dial disk 32. While the Bourdon tube is being filled with compressed air from pipe 30 it will, in well known manner, expand causing its outer end to turn, as a result of which, through the medium of the lever arm 35, the sector 36 will turn in the same direction transmitting rotation to the pinion 37 and thereby to the dial disk in the direction of the higher pressure, as indicated by arrow B. When pressure is reduced in said tube the latter will contract and cause the dial disk to turn in the opposite direction, i. e. in that of lower pressures indicated by arrow A (Fig. 3).

Connected to the pipe 28 is a branch pipe 28ᵃ leading to an element sensitive to an impulse caused by blood pulsation. This element may be a mercury controlled electric switch 38 or the like of any well known construction which will control an electric circuit through wires 2—2 of a source of electrical energy denoted by the poles I, II. The impulse felt by the low pressure cuff or pulse detector 19 will be transmitted through pipe 28ᵃ to said switch 38 as a result of which said electric circuit will be closed. The closure of this circuit will have the effect to stop rotation of the dial at the instant an impulse is received so that a numeral or character on the dial appearing in front of the opening or window 49 (Fig. 1) will denote the blood pressure of the user, as will be hereinafter more fully described.

Fixed to the pivot 17 of rock lever 16 is a lever 41 which simultaneously operates the exhaust valves 23, 24 through arms 42, 43 linked together by rod 44. Through these means when the lever arm 16 is being lowered onto the user's arm the exhaust valves 23, 24 will be positioned so that the compressed air flowing from the compressor 12 through the pressure control valves 21, 22 will be allowed to fill the cuffs 18 and 19 through pipes 27, 28 respectively and the compressed air from the high pressure valve 21 to flow into the Bourdon tube through the stop valve 31 which is electrically operated, as will be presently described. The open end of the Bourdon tube is also controlled by an electrically operated spring actuated needle valve 45, whose spring 46 tends to normally hold said needle valve in closed position. The lever 35 operated by the Bourdon tube carries an electric contact piece 47 which is adapted to cooperate with a stationary contact 48 to close an electric circuit through wires 6—6 which is adapted to energize a solenoid 70 the armature 71 of which carries said needle valve 45. In this open position the needle valve 45 will become locked by a spring actuated member 118 capable of engaging a notch 45ᵃ provided on stem of said needle valve the instant the latter is retracted from its closed position by the action of the solenoid 70.

It will be seen that as soon as the dial disk has rotated to the highest pressure numeral, the contacts 47, 48 will close the electric circuit energizing the solenoid 70, so that the needle valve 45 will open and permit the escape of compressed air reducing the pressure in said Bourdon tube 29. As a result thereof, the latter will contract and the disk 32 will now turn in the opposite direction, i. e. in the direction of the smaller pressure numerals. The escape of air through valve 45 will also produce a reduction of pressure in the cuff 18 thereby reducing the pressure on the user's arm. During this decrease of pressure in said cuff there will be an instant when the blood will commence to flow through the lower part of the user's arm past said blood occluding cuff 18. At that instant an impulse will be detected by the low pressure cuff 19 which carries compressed air of the constant pressure of 30 mm. It is this impulse which will be utilized to arrest the dial disk by stopping the escape of air through the opening controlled by the needle valve 45. At the time of arrest the dial will have turned down to a certain pressure which will be indicated by a numeral thereon that may be visible through the window 49. This window normally may be closed by an electrically controlled shutter 50 as will be hereinafter described.

When an impulse is detected by the low pressure cuff 19, the mercury controlled electric switch 38 will also effect the release of the opened needle valve 45 so that the same under its spring force may close the Bourdon tube. To this end the spring actuated member 118 in the present embodiment is formed as one arm of a bell crank lever whose other arm 117 is operatively connected to the armature 81 of a solenoid 80. The spring normally forces arm 118 into contact with the stem of the needle valve and causes it to snap into the notch 45ᵃ when the needle valve is moved into open position by the armature 71 of the solenoid 70. When the solenoid 80 is energized by the circuit traveling through wires 2—2 on the closing of the mercury controlled switch 38, the bell crank will be swung so as to disengage arm 118 from notch 45ᵃ as a result of which the needle valve 45 will be released and permitted under the action of its spring to close the Bourdon tube. By closure of this needle valve 45 the dial disk 32 which owing to the escape of air was turning in the direction of the lower pressure is instantaneously arrested.

In order to be certain that the impulse transmitted to the cuff 19 and to the mercury controlled electric switch 38 is due to pulsation of the blood and not to any other cause, such as a jerk or movement of the arm of the user or the like, we provide safety means comprising a system of time controlled elements whereby the transmission of the incoming pulse to the recording device will first stop the dial but not affect the shutter 50 until there have been several impulses at uniform intervals indicative of pulsation of the blood.

In the present embodiment three such time controlled elements 51ᵃ, 51ᵇ and 51ᶜ are provided. Each of these elements may be in form of an air cylinder 51' and a plunger 51² of conductive material working therein and whose total stroke is a little more than the maximum interval of blood pulsation, say 1½ seconds. The stem 51³ of each plunger 51² is normally engaged by a spring actuated catch 52 formed by the armature of a solenoid. Alongside each plunger stem is a contact piece of a certain length to correspond with said time of 1½ seconds. The solenoid 53' of the first control switch is energized by the circuit passing through wires 2, 2'.

Hence, simultaneously, with the closure of the mercury switch 38 the solenoid 53' of the first control switch 51ᵃ will cause the release of the plunger of said first switch permitting it to descend in its air cylinder. Now, if the impulse felt by the cuff 19 was that of a blood pulse, then the next impulse must come within the time of the regular interval of blood pulsation, say 1½ seconds time, i. e. during the descent of the plunger in the first time control switch 51a. When this happens, a cross piece 51⁴ on the stem of said plunger operates a switch 54' of a circuit passing through wires 2, 3 which energizes the solenoid 53² of the next time control switch 51b, releasing the plunger of the latter in the above described manner. And when the next impulse comes within said time limit then through a switch 54² a circuit is closed which flows through wires 2, 3, 3', energizing the solenoid 53³ of the next time controlled switch 51c releasing the plunger in said last switch in the same manner. The plunger will cooperate with contact 54³ closing a circuit flowing through wires 2, 3 and 3² and actuating a solenoid 55, the armature 56 of which actuates a lever 57 fixed to the stem 50a of the shutter 50, causing the latter to swing so as to open the aperture 49 and expose the numeral indicating the pressure that at the arrest of the dial came to lie opposite the window 49. This numeral will indicate the correct blood pressure of the user.

The shutter 50 is controlled by a time valve 50b of any suitable construction, so that it will automatically shut the window 49 after a few seconds.

The valve 31 is operated so as to close or open by the armature 61a of solenoids 61, 61' of which solenoid 61 will be energized by circuit flowing through wires 2, 2, adapted to close the valve at the instant the mercury switch 38 is closed, i. e. at the first felt impulse and the other solenoid 61' through wires, 3, 4 and 5 to open the valve 31.

In the bottom of each of said time controlled switches are two insulated contact pieces 60, which will be bridged by the plungers when reaching the bottom. This bridging of the contacts 60 will happen in case of a false impulse and will close the electric circuits flowing through wires 3, 4 and 5 and through the solenoid 61' causing valve 31 to open and permit compressed air to flow into the Bourdon tube as a result of which the dial will turn in the direction of high pressure numbers.

When the impulses transmitted to the time controlled switches come in at regular intervals indicative of blood pulsations, the plungers of the time controlled switches 51a and 51b must be prevented from descending to the very bottom of their cylinders and from thereby bridging the contacts 60. This is accomplished as follows:—

Extending transversely of the stems of the plungers of all three time controlled switches 51a, 51b and 51c is a movable spring actuated bar 58 having several cam surfaces and which is a part of the armature of solenoids 59a, 59b and 59c. These solenoids 59a and 59b are energized by the circuits closed by the switches 54', 54², through the wires 3, 3, and 3', 3' respectively and solenoid 59c by the circuit controlled by the switches 60, through wires 3, 4 and 5.

Each time either of the switches 54', 54² is closed the solenoid 59a or 59b is energized causing the bar 58 to move slightly to the right and bring a cam surface 58a or 58b as the case may be into the path of a roller 62 carried by the upper end of the respective plunger stem. These cam surfaces will prevent the corresponding plunger from descending to the very bottom of the cylinder and from bridging contact pieces 60 which would cause the energizing of solenoid 61' and opening of valve 31.

The pin valve 45 is adapted to be locked in open position at the instant the dial has turned to the highest pressure, i. e. when the switch 47, 48 was closed.

In order to permit the automatic resetting of the parts after the test was completed we provide the following means:—

When any one of the plungers in the time controlled switches reaches the bottom of its cylinder the contacts 60 will close the circuit through the solenoid 59c through wires 3, 4 and 5 as a result of which the bar 58 will move further to the right, to such an extent as to cause the several cam portions 58c to lift the plungers of said time switches 51a, 51b and 51c into initial position and to be caught by the spring actuated catches 52 which are parts of the armatures of the solenoids 53', 53² and 53³.

When the test is completed, the user first releases his arm by releasing the lever 16 from the pawl 40 and permitting the arm to swing into its initial position by the force of its spring 16a. On stepping off the platform the compressor drawing in fresh air through an inlet valve 90 expands, while the bar 58 by the force of its spring 58' will be pulled to the left into its initial position shown in Fig. 2.

In order to permit persons of different heights to use the machine, the rest 15 and arm 16 may be made adjustable in any suitable manner. In the present embodiment the rest 15 is supported on pivots 15a to swing vertically on the shelf 14 and the arm 16 is made of two sections pivoted together at 16b so as to enable the front section to be swung laterally to conform with the position of the rest 15.

To hold the forearm of the user steady while the rear part rests on rest 15 and thereby prevent any false impulses from being transmitted to the sensitive element 38, we provide guides in the form of a pair of vertical parallel bars 91 fixed to the frame in range with the rest 15 between which the forearm of the user will be engaged.

Figure 1:
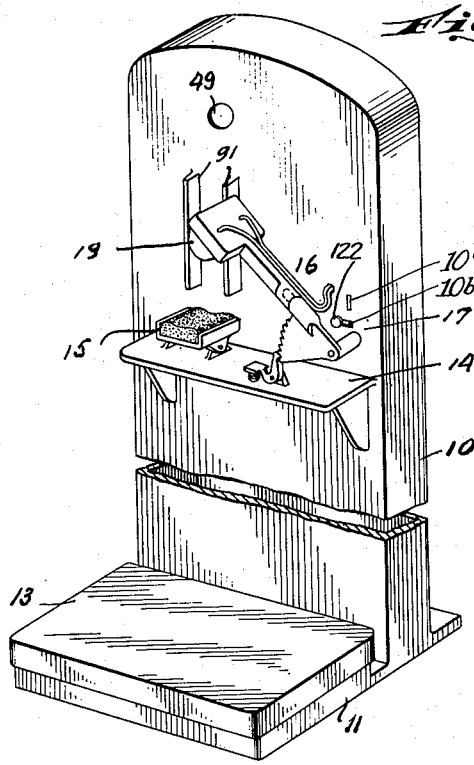
Fig. 1 is a perspective elevation of our machine.

100 denotes a suitable coin control device arranged inside the frame or casing 10. The same may consist of two horizontally disposed and movable arms 100a, 100b, each of which at one end is actuated by a spring 120, 121 respectively and at its free end is formed with a recessed portion 100c, 100d, respectively. The lever 100a may be formed with a grip or knob 122, while the lever 100b is formed with a nose or projection 123 adapted to normally engage a notch 124a provided in the circumference of a disk 124 fixed to the arm 16 or to its pivot 17 and thereby normally lock said lever in its raised position (Fig. 1). The two recessed portions 100a and 100b of said lever are adapted to be in range with one another and in a range with a coin receiving slot 10a provided in the front face of said frame 10 while the knob or grip 122 projects outwardly through a horizontal slot 10b of said frame 10. Upon the insertion of a coin through the coin slot 10a the latter enters the recesses of the arms 100a, 100b and couples the latter (Fig. 2). By gripping the knob and shifting the arm 100a to the right (Fig. 2) the arm 100b too will be moved in the same direction, as a result of which the nose or projection 123 will disengage the notch 124a of the disk 124 and release the arm 16, so that the latter may be lowered onto the part of the arm of the user.

In the modification shown in Fig. 6, 18a and 19a denote respectively the blood occluding cuff and the pulse detector which are adapted to be inflated from a compressor 12a and in which the pressure is controlled through the usual pressure control valves 21, 22 respectively. 32a denotes the rotary pressure indicating dial or the like. This dial may be operated from the compressor through the pressure control valve 21 and pipe 30a by a pump 101 having a piston 101' held under pressure of a spring 102 and whose piston rod terminates in or has attached to it a rack 101². This rack meshes with pinion 37 fixed on the axis of the dial 32ª. Thus at the time the compressor 12ª is operated to inflate the cuffs 18ª, 19ª, the dial will be caused to rotate in the direction of the higher pressures marked thereon as in the first modification. On opening a valve 12ᵇ and thereby reducing the pressure in said compressor said dial will be caused to rotate in the direction of lower pressures and on closing the valve 12ᵇ and releasing said compressor 12ª said dial will be caused to be arrested. The correct blood pressure on said dial may be indicated in any well known and suitable manner as by an arrow marked on a stationary part arranged adjacent to said dial (not shown).

The blood occluding cuff 18ª and pulse detector may in any suitable manner be applied to the arm of the user.

In order to assist the user in identifying the correct pulse beats we provide the following means:—

The pulse detector 19ª may be provided with a sound amplifying means 104 of any well known suitable construction which is suitably arranged thereon so that at the instant the blood is permitted to pass through the arm after the pressure in the blood occluding cuff 18ª has been sufficiently reduced, as stated in connection with the first modification, there will be an impulse detected by the pulse detector 19ª. This impulse will be transmitted to the diaphragm (not shown) of said amplifying device 104. Connected with the amplifier may be an ear piece 105 of an ordinary telephone receiver or the like, which the user may apply to his ear at the time he takes his blood pressure.

It is understood that various other changes may be made in the construction of our machine without departing from the principle of our invention and we, therefore, do not wish to restrict ourselves to the details shown and described.

What we claim is:—

1. In a blood pressure testing instrument, a compressor operable by the weight of the user, a blood occluding means associated with said compressor, a movable pressure indicator operable both from said compressor and said blood occluding means, said pressure indicator being provided with a leak vent, a spring pressed valve normally closing said vent, means controlled by said pressure indicator to open said valve to relieve the pressure in the blood occluding means when the pressure reaches a predetermined amount, means to lock the valve in open position, a pulse detector, means controlled by said pulse detector to release the locking means to cause the valve to close and to cut off communication between the compressor and the blood occluding means and indicator whereby the pressure indicator is arrested at the instant the pressure of said blood occluding means is reduced to permit the flow of blood past the same and detected by said detector, means for masking the reading face of the pressure indicator, a series of safety means controlled and successively responsive to repeated impulses, means controlled by the last of the safety means to move the masking means to expose the reading face of the pressure indicator.

2. In a blood pressure testing instrument, a compressor operable by the weight of the user, a blood occluding means associated with said compressor, a movable pressure indicator having a leak vent and operable both from said compressor and said blood occluding means, yieldable means normally closing said leak vent, means controlled by said pressure indicator to open said leak vent closing means to relieve the pressure in said blood occluding means when the pressure reaches a predetermined amount, means to retain said leak vent closing means in open position, a pulse detector, means controlled by said pulse detector to permit said leak vent closing means to close, and to cut off communication between said compressor and said blood occluding means and indicator and thereby arrest said indicator at the instant the pressure of said blood occluding means is reduced to such an extent as to permit the flow of blood past the same and detected by said detector, means for signalling the pressure on said pressure indicator and means responsive to an impulse detected by said pulse detector to actuate said signalling means.

3. In a blood pressure testing instrument according to claim 2 in which said blood occluding means and said pulse detector are carried by a common manually movable arm and an arm rest is provided in range with said movable arm.

4. In a blood pressure testing instrument, according to claim 2 in which the compressor is part of a movable platform for the user.

5. In a blood pressure testing instrument according to claim 2 in which said blood occluding means and pulse detector are carried by a movable arm and means are provided for locking said arm in the position in which the blood occluding means stops the circulation of the blood.

6. In a blood pressure testing instrument according to claim 2 in which high and lower pressure control means are associated with said compressor for controlling the pressure in said blood occluding means and said impulse detector respectively.

7. In a blood pressure testing instrument according to claim 2 in which said blood occluding means and pulse detector are carried by a movable member, and pressure control valves are provided for supplying the pressure to said blood occluding means and pulse detector, said valves being automatically controlled through said member.

8. In a blood pressure testing instrument according to claim 2 in which are provided a stop valve between said blood occluding means and said pulse detector, and means responsive to an impulse in said pulse detector for closing said valve and thereby cut off communication between said compressor, blood occluding means and indicator.

9. In a blood pressure testing instrument according to claim 2, in which are provided a valve to normally close said leak vent, and electric means to open said valve, said electric means including a solenoid whose armature is associated with said valve and an electric switch actuated by said pressure indicator and adapted to be closed when the pressure in said indicator reaches a predetermined amount.

10. In a blood pressure testing instrument according to claim 2 in which are provided a valve to normally close said vent, means to open said valve and electrically controlled locking means to hold said valve open, said electric means including a solenoid whose armature is operatively connected to said locking means and which is energized by a circuit controlled by a switch actuated through an impulse of the pulse detector.

11. In a blood pressure testing instrument according to claim 2 in which said means controlled by said pulse detector include an element responsive to an impulse thereof, and electrical means including a switch directly operated from said element.

12. In a blood pressure testing instrument according to claim 2 in which said impulse responsive means are electrically actuated, the electric means therefor including a switch responsive to an impulse of said pulse detector, a solenoid whose armature is operatively connected to said signalling means, and adapted to be energized on the closing of said switch.

13. In a blood pressure testing instrument according to claim 2 in which said impulse responsive means are electrically actuated, the electric means therefor including a series of time controlled electric switches and a solenoid whose armature is operatively connected to said signalling means and adapted to be energized on the closing of the last one of said time controlled switches.

14. In a blood pressure testing instrument according to claim 2 in which said impulse responsive means are electrically actuated, the electric means therefor including a series of time controlled electric switches, a solenoid whose armature is operatively connected to said signalling means and adapted to be energized on the closing of the last one of said time switches, and means for automatically restoring said time switches to initial position after the test has been completed.

15. In a blood pressure testing instrument according to claim 2 in which the signalling means includes a window in said pressure indicator, a shutter for closing said window and means responsive to an impulse of said pulse detector for actuating said shutter.

DAVID TELSON.
ERNEST D. RESNIK.